United States Patent [19]

Kober et al.

[11] 4,117,601
[45] Oct. 3, 1978

[54] LONGITUDINAL MEASURING INSTRUMENT

[75] Inventors: Hans-Rudolf Kober; Alfons Ernst, both of Traunreut, Fed. Rep. of Germany

[73] Assignee: Firma Dr. Johannes Heidenhain GmbH., Traunreut, Fed. Rep. of Germany

[21] Appl. No.: 766,389

[22] Filed: Feb. 7, 1977

[30] Foreign Application Priority Data

Feb. 10, 1976 [DE] Fed. Rep. of Germany ....... 2605020

[51] Int. Cl.[2] ............................................. G01B 7/02
[52] U.S. Cl. .................................... 33/172 E; 33/125 C
[58] Field of Search ............ 33/125 A, 125 C, 143 L, 33/147 N, 172 E, 174 L, DIG. 3; 250/237 G

[56] References Cited

U.S. PATENT DOCUMENTS

| | | | |
|---|---|---|---|
| 3,354,553 | 11/1967 | Heldmaier | 33/147 N |
| 3,533,703 | 10/1970 | Wingate | 250/237 G |
| 3,851,396 | 12/1974 | Klabunde | 33/143 L |
| 3,987,552 | 10/1976 | Raiteri | 33/143 L |
| 4,037,325 | 7/1977 | Weber et al. | 33/125 C |

FOREIGN PATENT DOCUMENTS 1,206,592 9/1970 United Kingdom .................. 33/125 A Primary Examiner—Richard R. Stearns
Attorney, Agent, or Firm—John J. Pavlak; Gary M. Ropski

[57] ABSTRACT

A longitudinal measuring instrument, preferably with digital path coverage, which is constructed according to the Abbe principle. The measuring instrument includes a stationary scale, a displaceably mounted scanning unit for scanning the scale, and a measuring spindle sleeve mounted on the scanning unit, said measuring spindle comprising at least two bars which surround the scale.

15 Claims, 4 Drawing Figures

LONGITUDINAL MEASURING INSTRUMENT

BACKGROUND OF THE INVENTION

1. Field of the Invention

The invention relates to a longitudinal measuring instrument, preferably with digital path coverage, which is constructed according to the Abbe principle. As is known in the art, the Abbe principle requires that a path to be measured be the rectilinear continuation of the graduation of the measuring instrument. In this manner measuring errors of the first order are avoided which may have been caused, for example, by the displacement of a movable member from its guides.

2. Description of the Prior Art

Longitudinal measuring instruments designed according to the Abbe principle are already known, for example, from West German Auslegeschrift No. 1 237 334. The apparatus disclosed in that Auslegeschrift has a measuring spindle sleeve which is slidingly positioned in rollers with a glass scale built into its axis. In order to read the scale, a stationary optical reading instrument is mounted at a housing of the longitudinal measuring instrument. This arrangement of the prior art requires a large overall length for the measuring instrument.

SUMMARY OF THE INVENTION

The present invention comprises a longitudinal measuring instrument including a stationary scale, a displaceably mounted scanning assembly, and a measuring spindle sleeve of at least two bars surrounding the scale and mounted on the scanning assembly. In the preferred embodiment the bars are arranged symmetrically about the graduation axis of the scale. This "graduation axis" is defined by the center of the graduation width used for measuring.

Accordingly, it is an object of the present invention to provide a longitudinal measuring instrument, which utilizes the Abbe principle, which has high precision, and which operates over a large measuring range but has a relatively small overall length as well as a relatively small weight plus extremely stable and simple design.

Other objects, features and advantages of the present invention will become apparent upon reading the following detailed description of the preferred embodiments in conjunction with the accompanying drawings.

DESCRIPTION OF A PREFERRED EMBODIMENT

The preferred embodiment comprises a digital longitudinal measuring scanner according to the present invention with incremental path coverage. In incremental measuring systems the readings are indicated at an electronic count-up/count-down counter in numerical form. A counter which is particularly appropriate for the longitudinal measuring scanner of the present invention is described in West German Gebrauchsmuster No. 7 413 290. The manner of operation of incremental measuring systems is well-known in the prior art and therefore is not explained in detail in this application.

Figure 1:
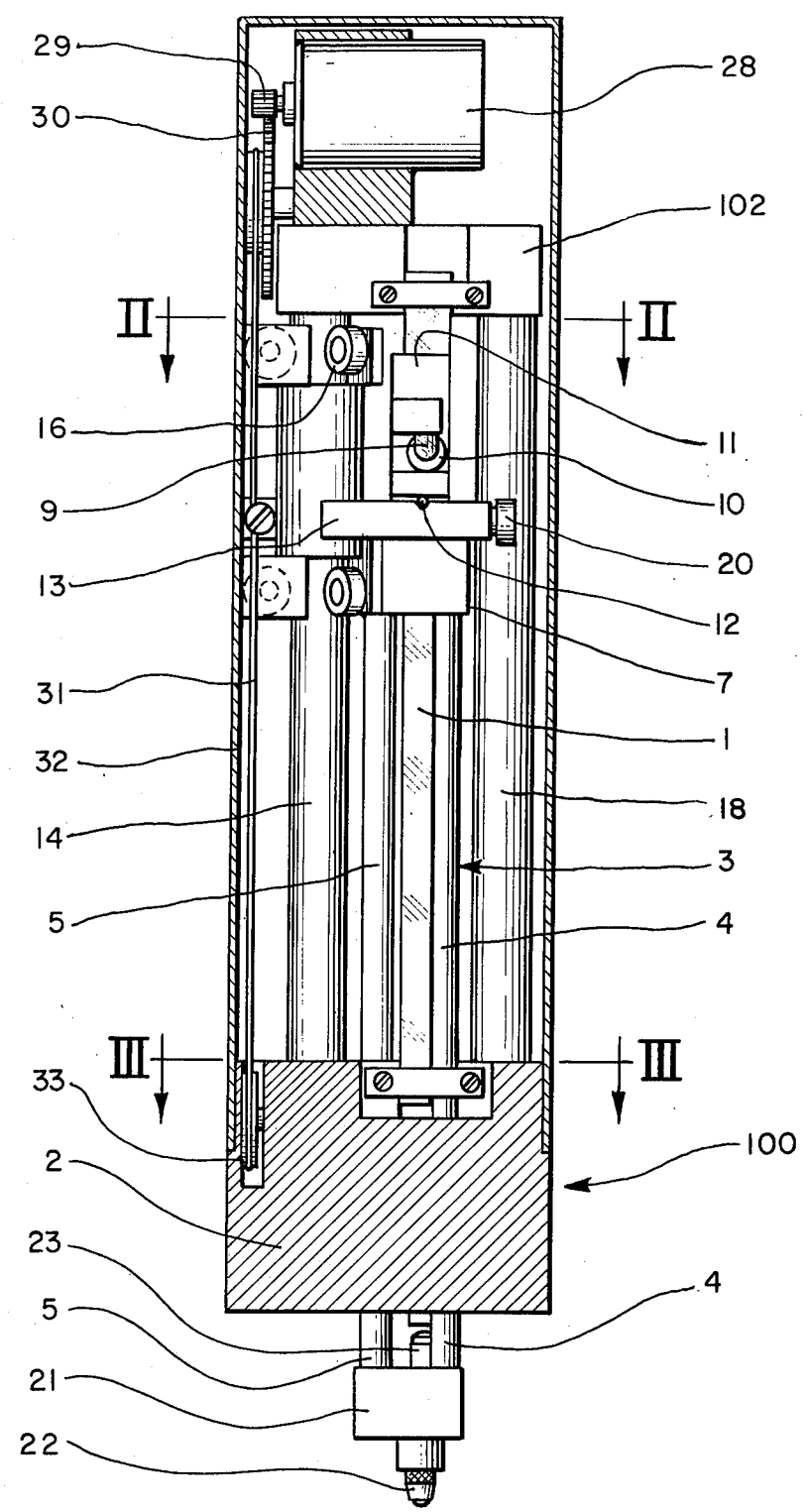
FIG. 1 is a lengthwise cross-sectional view of a longitudinal measuring instrument of the present invention.
Figure 4:
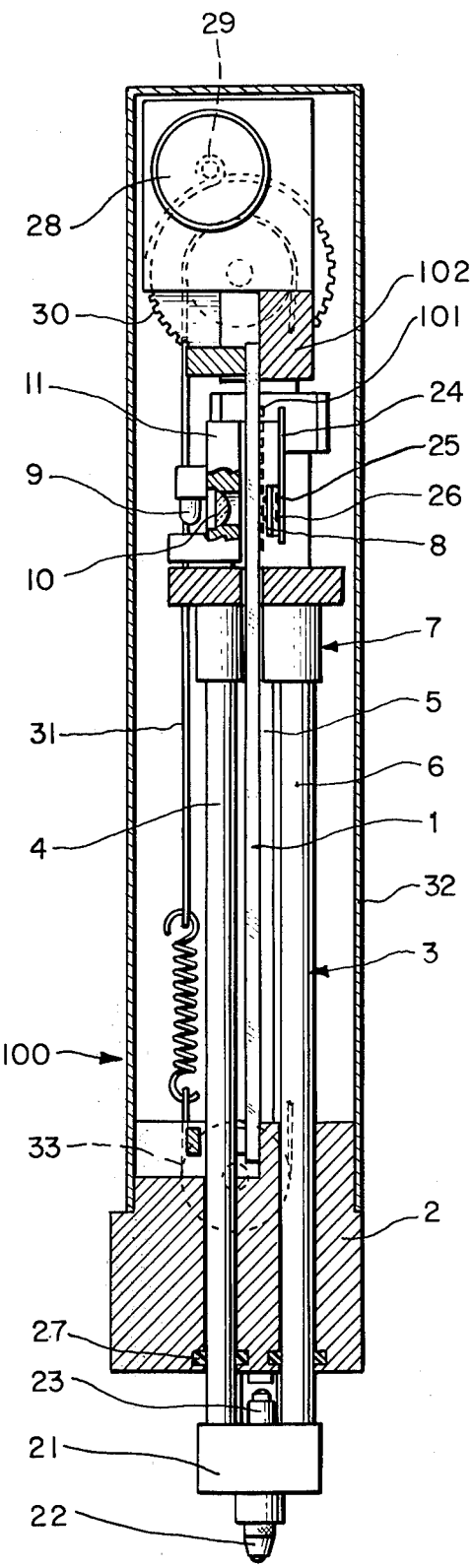
FIG. 4 is a lengthwise cross-sectional view of a measuring instrument of the present invention taken along line IV—IV of FIG. III.

Referring now to the drawings, and more particularly to FIGS. 1 and 4, there is illustrated a longitudinal measuring scanner of the present invention indicated generally by reference numeral 100. The scanner 100 includes a grid scale 1 which is adhesively attached to a component 2 and clamped to a component 102. A grid graduation 101 of the grid scale 1 forms the rectilinear continuation of the axis of a measuring spindle sleeve 3. The measuring spindle sleeve 3 comprises bars arranged symmetrically with respect to the graduation axis T of the grid graduation 101. In one preferred embodiment the measuring spindle sleeve 3 comprises three bars 4, 5, and 6, symmetrically disposed along the circumference of a circle whose center is at the graduation axis T.

A grid scanning plate 8 which scans the grid scale 1 without contacting the grid scale 1 is provided at the scanning unit 7. The scanning plate 8 is mounted at the holding means 11 along with a lamp 9, a condenser lens 10, and a support 24 for photoelectrical components 25 and 26. The holding means 11 may be pivotally adjusted by the use of a roller 12 rotatably seated within V-shaped grooves. Secure fixation of the holding means 11 is accomplished by pouring adhesive into the V-shaped grooves and adjacent joints of component 13 of the scanning unit.

Figure 2:
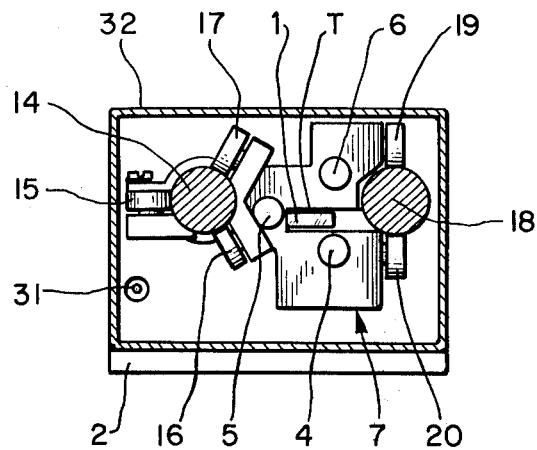
FIG. 2 is a lateral cross-sectional view of the measuring instrument of FIG. 1 taken along line II—II.

Referring now to FIG. 2, the scanning unit 7 is illustrated surrounding the grid scale 1 without contact. The scanning unit 7 is positioned for easy movement along a circular guide means 14 via rollers 15, 16, and 17. Unwanted rotational movement of the scanning means 7 is prevented by a bar 18 at which engages the scanning unit 7 via rollers 19 and 20. The bars 14 and 18 and the grid scale 1 are fastened to the components 2 and 102. To protect the elements of the scanner 100 against contamination from the environment in which it is used, a housing 32 surrounds the scanner 100 and is fastened to the component 2.

Figure 3:
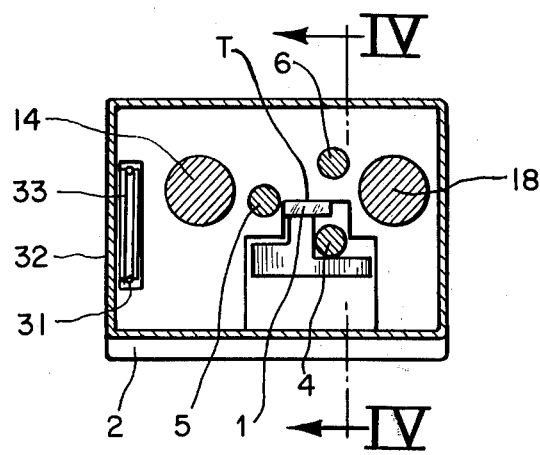
FIG. 3 is a lateral cross-sectional view of the measuring instrument of FIG. 1 taken along line III—III.

The measuring spindle sleeve 3 comprising the bars 4, 5 and 6 is mounted in a cantilever fashion to one end of the scanning unit 7. At the opposite end, the bars 4, 5 and 6 are inserted into a plate 21 as shown in FIG. 1. A measuring insert 22 is inserted into the plate 21 in alignment with the graduation axis T of the grid scale 1. A bolt 23 at the plate 21 is used to limit the stroke of the measuring spindle sleeve 3. As is shown in FIGS. 3 and 4, the component 2 is provided with bores through which the bars 4, 5 and 6 pass without engaging the walls of the bores. Sealing members 27 surround the bars at the end of the bores closest to the plate 21 to prevent impurities from entering the bores. The sealing members 27 are constructed so as to substantially exert no restraining forces upon the bores 4, 5 and 6.

The scanning unit 7 and the measuring spindle sleeve 3 fastened to it are moved in the preferred embodiment by means of an electric motor 28 to which gears 29 and 30 are coupled. The gear 30 is attached to a cable drive assembly which includes a cable 31 and a pulley 33. The electric motor 28 provides the power which can retract the measuring spindle sleeve 3 from a blank to be measured and also retards the advancement of the measuring spindle sleeve 3 to act as a brake. If the longitudinal measuring scanner 100 is mounted so that the measuring spindle sleeve 3 moves vertically, the braking effect of the motor 28 so controls the downward movement of the measuring spindle sleeve 3 that the measuring insert 22 is slowly lowered onto the blank. Alternatively, the longitudinal measuring scanner 100 may be arranged horizontally, and the electric motor may also be used to generate a measuring force. These above-mentioned operations of the longitudinal measuring scanner 100 are accomplished with an electrical installation (not shown) which controls the polarity and amplitude of the electrical current supplied to the electric motor 28.

The longitudinal measuring scanner of the invention offers a number of important advantages, such as: reduced overall length at a broad measuring range (because the stationarily mounted measuring grid scale 1 is provided in the central area of the measuring spindle sleeve 3); low weight of the measuring spindle sleeve 3 (because it is composed of individual elements 4, 5, and 6); stable and simple design; ease of manufacture and adjustment; versatile possibilities of application due to low space requirement; high measuring precision (because the graduation 101 of the grid scale 1 is in alignment with the axis of the measuring spindle sleeve 3).

Though the embodiment hereinbefore described is preferred, many modifications and refinements which do not depart from the true spirit and scope of the invention may be conceived by those skilled in the art. It is intended that all such modifications and refinements be covered by the following claims.

We claim:

1. An instrument for measuring distances along a path, comprising:
   a housing;
   a scale mounted within said housing, said scale having a longitudinal graduation axis;
   means for scanning said scale along the graduation axis;
   means for supporting said scanning means, said supporting means being displaceably mounted with respect to said housing and having at least two bars positioned parallel to the graduation axis; and
   a measuring element mounted on said bars of said supporting means, said bars having a length sufficient to position said measuring element beyond an end of said scale along a straight-line continuation of the longitudinal graduation axis of said scale.

2. The measuring instrument of claim 1 wherein the bars are arranged symmetrically with respect to the graduation axis of the scale.

3. The measuring instrument of claim 1 including a precision guide means for guiding said supporting means and wherein each of said bars is supported only at one end whereby said bars are cantilevered with respect to said scanning means.

4. The measuring instrument of claim 1 having three bars positioned parallel to and symmetrically about the graduation axis of the scale.

5. The measuring instrument of claim 1 wherein said supporting means is attached to one end of each of the bars and the other end of each of the bars is secured to a rigid member connecting the bars.

6. The measuring instrument of claim 5 wherein the measuring element is a measuring probe mounted on said rigid member.

7. The measuring instrument of claim 1 wherein said scanning means is positioned at a spaced distance from said scale whereby said scanning means does not contact said scale.

8. The measuring instrument of claim 7 further comprising guide means for said supporting means, and rollers attached to said supporting means pressing against the guide means such that said scanning means is precisely positioned for movement parallel to the graduation axis of the scale.

9. The measuring instrument of claim 6 wherein the measuring instrument is adapted to be mounted vertically and including a motor means coupled to said scanning means such that the measuring probe connected to said scanning means may be retracted from a blank to be measured and lowered onto the blank.

10. The measuring instrument of claim 6 wherein the measuring instrument is adapted to be mounted horizontally and includes a motor means coupled to said scanning means wherein the motor means generates a measuring force exerted by the measuring probe against a blank to be measured.

11. An instrument for measuring distances along a path comprising:
    a frame member;
    a scale mounted to said frame member and having a longitudinal graduation axis;
    means for supporting a measuring probe, said probe supporting means mounted on said frame member for displacement parallel to the axis of said scale, and having at least two bars symmetrically positioned parallel to the graduation axis;
    means for scanning said scale along the graduation axis, said scanning means mounted to said probe supporting means; and
    a measuring probe attached to said bars of said probe supporting means, said bars having a length sufficient to position said measuring probe beyond an end of said scale along a straight-line extension of the longitudinal graduation axis.

12. The measuring instrument of claim 11 wherein said scanning means is mounted adjacent one end of each of said bars of said probe supporting means, and further comprising a rigid connecting member attached to the second end of each of said bars, said measuring probe being mounted on said rigid member.

13. The measuring instrument of claim 11 wherein said scanning means is positioned at a spaced distance from said scale whereby said scanning means does not contact said scale.

14. The measuring instrument of claim 13 further comprising means for guiding said supporting means and rollers attached to said supporting means pressing against the guiding means whereby said scanning means is precisely positioned for movement parallel to the graduation axis of the scale.

15. The measuring instrument of claim 11 wherein the probe supporting means is cantilevered with respect to said scanning means.

* * * * *

UNITED STATES PATENT AND TRADEMARK OFFICE
CERTIFICATE OF CORRECTION

PATENT NO. : 4,117,601
DATED : October 3, 1978
INVENTOR(S) : Hans-Rudolf Kober and Alfons Ernst It is certified that error appears in the above-identified patent and that said Letters Patent are hereby corrected as shown below:

Under the heading "FOREIGN PATENT DOCUMENTS" on the first page of the patent, the following reference should be inserted:

1,237,334   3/1967   Germany..............3/172 E

Signed and Sealed this

Ninth Day of January 1979

[SEAL]

Attest:

RUTH C. MASON
Attesting Officer

DONALD W. BANNER
Commissioner of Patents and Trademarks